Patented Oct. 3, 1922.

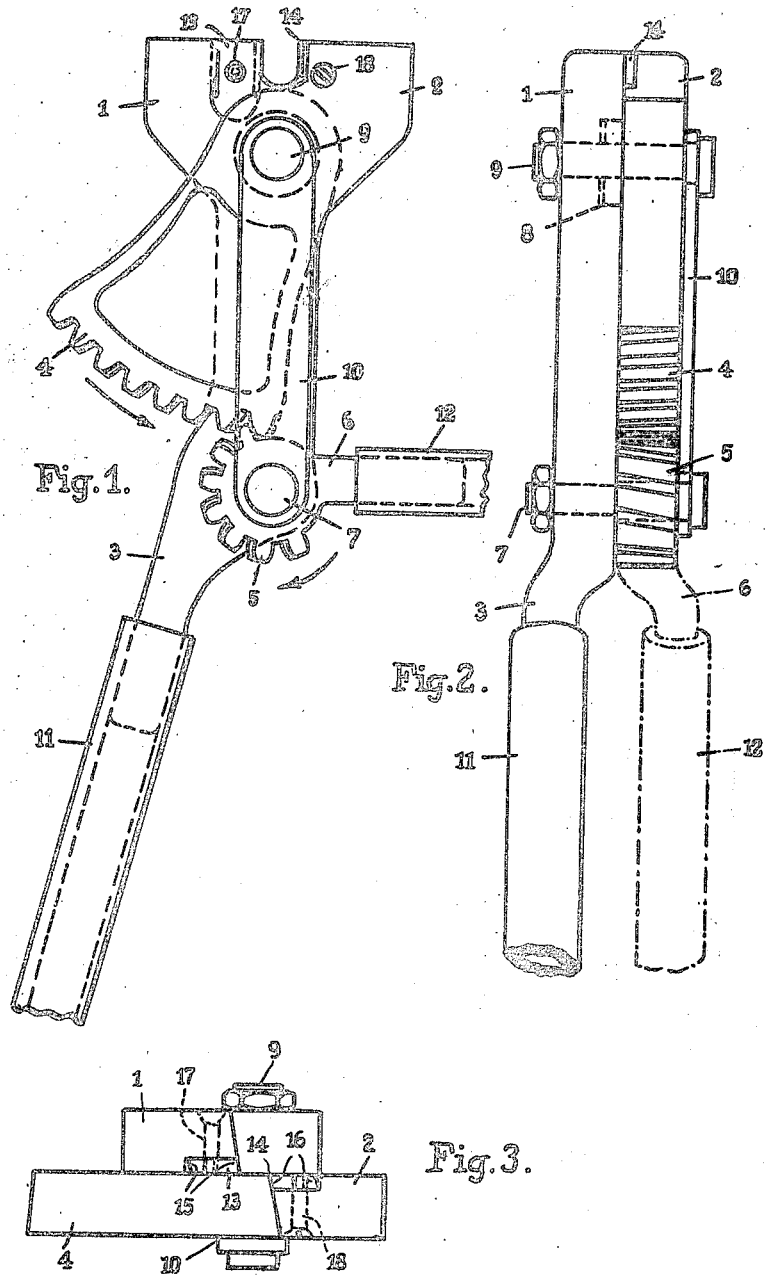

1,430,705

UNITED STATES PATENT OFFICE.

ANTON WAGENBACH, OF ELBERFELD, GERMANY.

SHEARS ESPECIALLY FOR ROLLED IRON.

Application filed June 17, 1921. Serial No. 478,372.

*To all whom it may concern:*

Be it known that I, ANTON WAGENBACH, a citizen of the Commonwealth of Germany, and a resident of Elberfeld, Germany, have invented new and useful Shears Especially for Rolled Iron, for which I have filed an application in Germany dated June 6, 1917 (W 49372 I/49 $b_2$), of which the following is a specification.

In shears for cutting rolled iron a disadvantage has existed inasmuch as the cutters spring apart at right angles to the cutting direction, so that for cutting iron of any particular thickness it is necessary to use especially heavy shears with complicated adjusting devices.

The essential part of the present invention consists in the elimination of the disadvantage mentioned and more especially in providing the cog wheel rims used in moving the cutters in the usual manner, with oblique teeth, so that the axial pressure of these oblique teeth presses the cutters against each other. By adjusting the oblique position of said teeth the action can be exactly regulated so that the cutters are always in the proper position for cutting heavier or thinner rolled iron or sheet iron. The action regulates itself automatically, seeing that the axle pressure in the teeth increases in equal proportions with the tangential force which is brought to bear. Accordingly in cutting heavy iron sheeting which especially tends to cause the shears to spring apart crosswise an especially powerful counter effect is produced. The practical result of this is that light shears without heavy base plates and adjusting devices attain the greatest durability, the blades remaining in good working order after long use, so that the cutting performed is correspondingly clean. This is of especially great importance in the cutting of trussed concrete iron, seeing that in buildings the shears must needs be held in every imaginable position and often inserted into cavities of difficult access.

Another important detail of the new shears is that the swivel joint of the cutters is formed by a hub-like projection on one of the cutters which fits into a corresponding cavity on the other cutter. In this manner a slight tipping of the cutter is effected which serves to increase the axial pressure of the oblique cog wheels. In addition to this the contact surface of the swivel joint by which the cutting power is communicated, is so constructed that it can be shifted very close to the cutters.

The drawing shows an example of the new shears, as follows:

Fig. 1 a front view,
Fig. 2 a lateral view,
Fig. 3 an end view of the cutters.

The shears have two cutters 1, 2 of which the handle part 3 of the first serves as bearing for the lever mechanism. The second cutter 2 is fitted with an arched rack 4 which engages a cog wheel sector 5 fitted with the handle 6 by means of which the cutting operation is performed. The arched racks or cog wheel sectors 4, 5 are provided with oblique cogs so that in the cutting operation which takes place in the direction pointed out by the arrow the driving cog wheel sector slightly lifts the driven arched rack, at the same time pressing the cutter 2 in a direction at right angles to the cutting direction by endeavoring to tilt it around on its joint.

The joints on the handles 3 are constructed in such manner that for the driven arched rack 5 a bolt 7 is inserted in said rack and the handle portion 3, whereas for the driven arched rack 4 and the second cutter 2 the power transmitting portion of the joint is formed by means of a wellknown hub-like projection fitting into a corresponding depression of the other cutter, a bolt 9, which is only subjected to tensile strain, absorbing all side strains. The two bolts 7, 9 are connected at their heads by a butt-strap 10 and are so adjusted that they can be fully tightened without in any way affecting the working of the lever. The tubes 11, 12 are fitted as lever arms to the two handle parts 3, 6.

The cutters 1, 2 are provided with interchangeable blades 13, 14 which are sharpened in the well-known manner on both edges 15, 16 so that they can do double service. The seat of the cutters is secured by means of an undercut to fit the cutting edges 15, 16 and the length of the steels is greater than that of the cutting edge. Consequently the blades 13, 14 communicate all forces resulting during the cutting to the cutters 1, 2 and the fastening bolts 17, 18 of the blades are only required to resist incidental forces.

In order to facilitate the handling of the shears in cutting various thicknesses of rolled iron, the handle arms 11, 12 can be drawn so far apart that the arched racks 4, 5, become disengaged, whereby in reengaging they may be so adjusted that the two handle arms 11, 12 are at proper distance from each other for best effecting the cutting operation.

Having now particularly described and ascertained my said invention, what I claim and desire to secure by Letters Patent of the United States is:

1. Shears for rolled iron, comprising in combination a jaw, a handle fastened to said jaw, a second jaw pivoted to the first named jaw and having a toothed segment, and a further toothed segment pivoted to the first named jaw and fitted with a handle, the teeth of both segments engaging each other and being obliquely cut with respect to their swinging axles in such way, that in closing the jaws an axial pressure is exerted by the oblique teeth faces on the second jaw so as to press the cutters tightly against each other in the cross direction.

2. Shears for rolled iron, comprising in combination a jaw, a handle fastened to said jaw, a second jaw, a cylindrical projection of the one jaw extending into a corresponding cross bore of the other jaw, a tension bolt passing crosswise through both jaws in the middle of said projection, a toothed segment fitted to said second jaw, and a further toothed segment pivoted to the first named jaw and fitted with a handle, the teeth of both segments engaging each other and being obliquely cut with respect to their swinging axles in such way, that in closing the jaws an axial pressure is exerted by the oblique teeth faces on the second jaw so as to press the cutters tightly against each other in the cross direction.

In witness whereof I affix my signature.

ANTON WAGENBACH.